Oct. 14, 1947.   E. G. JOHANSSON   2,429,093
METER BOX
Filed Jan. 6, 1945
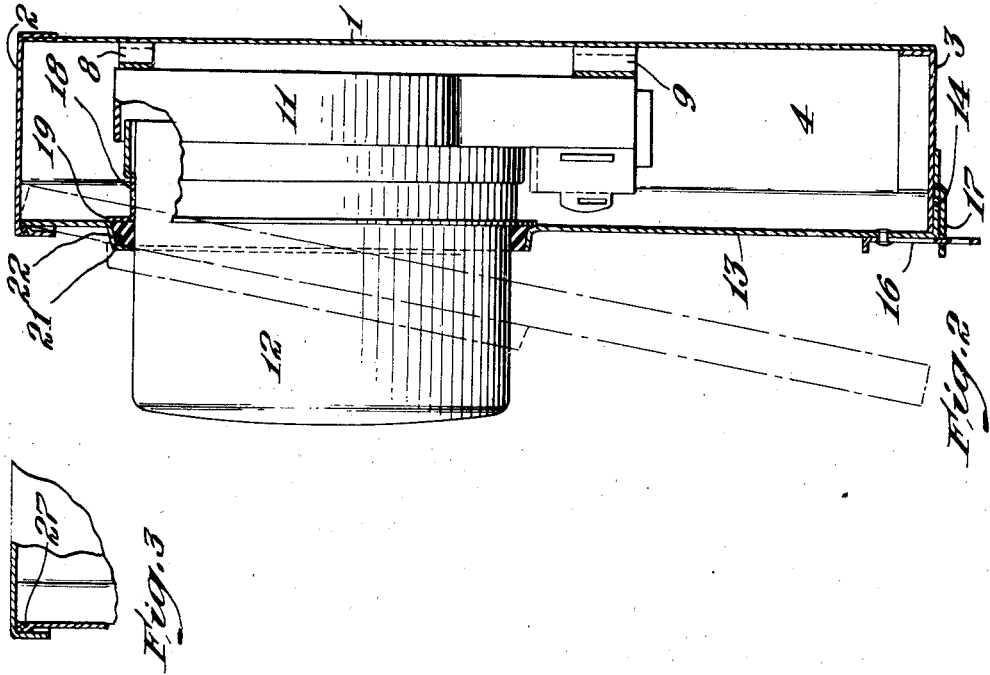
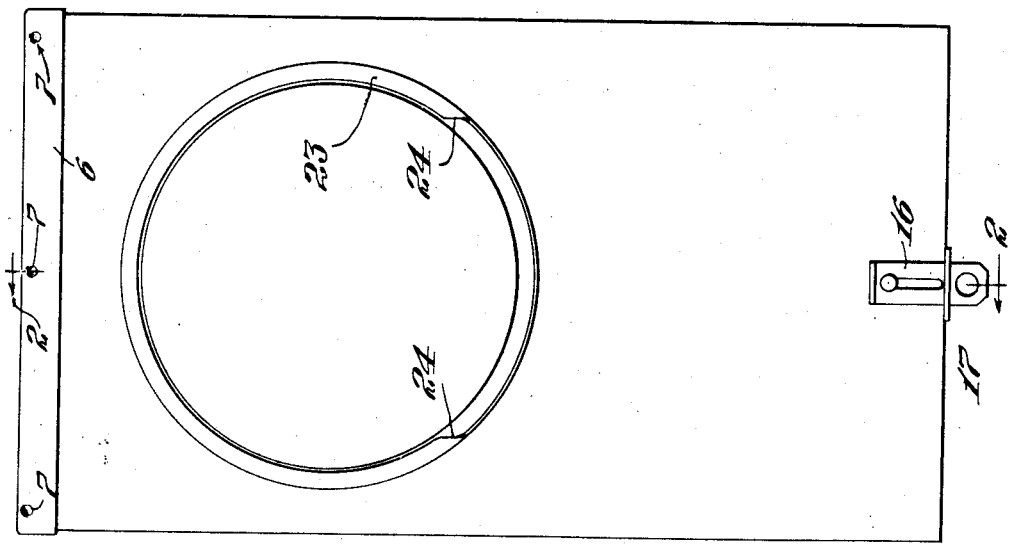
Inventor
Ernest G. Johansson
by Roberts, Cushman & Grover
Att'ys.

Patented Oct. 14, 1947

2,429,093

UNITED STATES PATENT OFFICE 2,429,093

METER BOX

Ernest G. Johansson, Belmont, Mass., assignor to Anchor Manufacturing Company, Boston, Mass., a corporation of Massachusetts Application January 6, 1945, Serial No. 571,614

9 Claims. (Cl. 175—224)

1

In the art of meter boxes it is desirable to have the glass cover of the meter, which is usually cylindrical, project beyond the face of the box, and it is also desirable to have the front of the box readily removable for meter testing and other purposes.

Objects of the present invention are to provide a meter box of the aforesaid type which is simple and economical in construction, is durable and reliable in use, and has a cover which can be removed quickly and easily and which provides a tight seal when in closed position.

According to the present invention the box has a shoulder overhanging one edge of the removable front cover and the cover has an opening to receive the projecting enclosure of the meter, the opening being spaced from the enclosure on the side opposite to the shoulder sufficiently to permit the cover to swing about the shoulder away from the box without obstruction by the enclosure. Surrounding the meter enclosure inside the front cover is a gasket which is compressed by the cover when the cover is pressed into closed position so as to seal the space between the cover and the enclosure. Preferably the cover is provided with an annular recess around the aforesaid opening to receive the sealing gasket when the cover is in closed position, the recess being defined by a side wall and an overhanging flange, the side wall being tapered to wedge the gasket against the enclosure and the flange being cut away on the side of the opening remote from the aforesaid fulcrum shoulder to permit the cover to swing about the shoulder away from the box without obstruction by the projecting end of the enclosure. The aforesaid shoulder is preferably in the form of a lip overhanging the upper edge of the cover with one or more protuberances on the lip or cover to serve as fulcrum points, whereby the cover is forced tightly against the edges of the box when in closed position and yet may be swung away from the box without interference by the lip.

For the purpose of illustration a typical embodiment of the invention is shown in the accompanying drawings in which Fig. 1 is a front elevation;

Fig. 2 is a vertical section; and

Fig. 3 is a similar section showing a modification.

The particular embodiment of the invention chosen for the purpose of illustration comprises a box comprising a back 1, a top 2, a bottom 3 and sides 4 integrally connected together as by welding. The top 2 has a depending lip 6 fast thereto, the lip having three indentations 7 which pro-

2 vide the aforesaid fulcrum points on the inside of the lip. Within the box are means 8 and 9 for mounting a meter comprising a base 11 and a cylindrical glass cover 12 which projects through the open front of the box.

The box also comprises a removable front cover 13 having side flanges overlapping the sides of the box and a bottom flange 14 overlapping the bottom of the box. The upper edge of the cover 13 fits under the protuberances 7 so that the cover is held tightly against the front edges of the side walls 4 when the cover is in the closed position shown in full lines in Fig. 2. Instead of forming the protuberances 7 on the lip 6 they may be formed on the cover as indicated at 27 in Fig. 3. The lower end of the cover may be equipped with suitable latching means such as the vertical slide 16 which engages through an opening in a hasp 17 fast to the bottom of the box.

Surrounding the inner end of the enclosure 12 is a ring 18 having an out-turned flange 19 which serves as a gasket seat, the inner end of the ring abutting against a shoulder of the meter base so that it can not move inwardly. Seating on the flange 19 is a rubber ring 21 which serves as a gasket to seal the joint between the cover 13 and the enclosure 12, the gasket being stretched to fit closely around the enclosure. The cover 13 is provided with an opening to receive the projecting end of the enclosure 12 and around this opening is a gasket recess comprising a side wall 22 and an in-turned flange 23. The side wall 22 is tapered so as to wedge the gasket against the enclosure 12 and the thickness of the gasket is such that it is compressed against the seat 19 by the flange 23 when the cover is in closed position. To permit the cover to swing away from the box without obstruction by the projecting end of the enclosure 12 the flange 23 is cut away at the bottom between the two shoulders 24 in Fig. 1. As the cover is swung outwardly at the bottom it swings about the fulcrum points 7 to the broken-line position shown in Fig. 2 before it meets the lower edge of the lip 6. By that time it has cleared the hasp and gasket sufficiently to permit it to move downwardly somewhat and then continue to pivot about the lower edge of the lip until it clears the outer end of the enclosure 12.

It should be understood that the present disclosure is for the purpose of illustration only and that this invention includes all modifications and equivalents which fall within the scope of the appended claims.

I claim:

1. A meter box of the type having an open front through which the enclosure of a meter projects a substantial distance with a sealing gasket surrounding the enclosure, the box having a removable front cover with an opening to receive said enclosure and a shoulder overhanging one edge of the cover, the cover having a tapered wall around said opening to wedge the gasket against said enclosure, and the edge of the opening on the side remote from said shoulder being spaced from the enclosure to permit the cover to swing about the shoulder away from the box without obstruction by the projecting end of the enclosure.

2. A meter box of the type having an open front through which the enclosure of a meter projects a substantial distance with a sealing gasket surrounding the enclosure, the box having a removable front cover with an opening to receive said enclosure and a shoulder overhanging one edge of the cover, the side of said opening remote from said shoulder being enlarged to permit the cover to swing about the shoulder away from the box without obstruction by the projecting end of said enclosure, and the cover having an annular recess around said opening to receive said sealing gasket when the cover is in closed position.

3. A meter box of the type having an open front through which the enclosure of a meter may project with a sealing gasket surrounding the enclosure, the box having a removable front cover with an opening to receive said enclosure and a shoulder overhanging one edge of the cover, the cover having an annular recess around said opening for said sealing gasket and a flange overlapping the gasket, the flange being cut away on the side of said opening remote from said shoulder to permit the cover to swing about the shoulder away from the box without obstruction by the projecting end of said enclosure.

4. A meter box of the type having an open front through which the enclosure of a meter may project with a sealing gasket surrounding the enclosure, the box having a removable front cover with an opening to receive said enclosure and a shoulder overhanging one edge of the cover, the cover having an annular recess around said opening to receive said sealing gasket when the cover is in closed position, the recess being defined by a side wall and an overhanging flange, the side wall being tapered to wedge the gasket against said enclosure, and said flange being cut away on the side of said opening remote from said shoulder to permit the cover to swing about the shoulder away from the box without obstruction by the projecting end of the enclosure.

5. A meter box of the type having an open front through which the enclosure of a meter may project with a sealing gasket surrounding the enclosure, the box having a removable front cover with an opening to receive said enclosure and a lip overhanging the upper edge of the cover with a protuberance on one of their opposing surfaces to serve as a fulcrum point, the cover having a tapered wall around said opening to wedge the gasket against said enclosure, and the lower edge of the opening being spaced from the enclosure to permit the cover to swing about the lip away from the box without obstruction by the projecting end of the enclosure.

6. A meter box of the type having an open front through which the enclosure of a meter may project with a sealing gasket surrounding the enclosure, the box having a removable front cover with an opening to receive said enclosure and a lip overhanging the upper edge of the cover with a protuberance on one of their opposing surfaces to serve as a fulcrum point, the lower side of said opening being enlarged to permit the cover to swing about said point to and from the box without obstruction by the projecting end of said enclosure, and the cover having an annular recess around said opening to receive said sealing gasket when the cover is in closed position.

7. A meter box of the type having an open front through which the enclosure of a meter may project with a sealing gasket surrounding the enclosure, the box having a removable front cover with an opening to receive said enclosure and a lip overhanging the upper edge of the cover with a protuberance on one of their opposing surfaces to serve as a fulcrum point, the cover having an annular recess around said opening for said sealing gasket and a flange overlapping the gasket, the flange being cut away on the side of said opening remote from said lip to permit the cover to swing about the shoulder to and from the box without obstruction by the projecting end of said enclosure.

8. A meter box of the type having an open front through which the enclosure of a meter may project with a sealing gasket surrounding the enclosure, the box having a removable front cover with an opening to receive said enclosure and a lip overhanging the upper edge of the cover with a protuberance on one of their opposing surfaces to serve as a fulcrum point, the cover having an annular recess around said opening to receive said sealing gasket when the cover is in closed position, the recess being defined by a side wall and an overhanging flange, the side wall being tapered to wedge the gasket against said enclosure, and said flange being cut away on the lower side to permit the cover to swing about the lip to and from the box without obstruction by the projecting end of the enclosure.

9. A meter box of the type having an open front, the box having a removable front cover with a meter opening therein, means for mounting a meter in the box with its front enclosure projecting a substantial distance through said opening, a gasket seat around said enclosure inside the cover, a gasket on said seat, the thickness of the gasket being such that it is compressed against the seat when the front cover is closed, the box having a shoulder overhanging one edge of the cover, and the edge of said opening remote from the shoulder being spaced from said enclosure to permit the cover to swing about the shoulder away from the box without obstruction by the projecting end of the enclosure.

ERNEST G. JOHANSSON.

REFERENCES CITED

The following references are of record in the file of this patent:

UNITED STATES PATENTS

| Number | Name | Date |
|---|---|---|
| 1,306,191 | Platt | June 10, 1919 |
| 2,182,603 | Walker et al. | Dec. 5, 1939 |
| 1,732,346 | Waller | Oct. 22, 1929 |
| 1,965,329 | Abbott | July 3, 1934 |